United States Patent
Kojima

(10) Patent No.: US 6,830,296 B2
(45) Date of Patent: Dec. 14, 2004

(54) WALK-IN APPARATUS FOR VEHICLE SEAT

(75) Inventor: Yasuhiro Kojima, Kariya (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 10/673,253

(22) Filed: Sep. 30, 2003

(65) Prior Publication Data

US 2004/0113477 A1 Jun. 17, 2004

(30) Foreign Application Priority Data

Sep. 30, 2002 (JP) ........................................ 2002-285353

(51) Int. Cl.[7] .............................................. B60N 2/00
(52) U.S. Cl. ....................................................... 297/341
(58) Field of Search ................................ 297/341, 340, 297/344.1, 318, 317, 378.1, 378.12, 216.1, 216.15; 248/429, 430

(56) References Cited

U.S. PATENT DOCUMENTS

| | | | | |
|---|---|---|---|---|
| 5,740,999 A | * | 4/1998 | Yamada | ........................ 248/429 |
| 5,882,074 A | * | 3/1999 | Kojima | ........................ 297/341 |
| 6,048,030 A | * | 4/2000 | Kanda et al. | ................ 297/341 |
| 6,149,237 A | * | 11/2000 | Morishita et al. | ........... 297/353 |
| 6,336,679 B1 | * | 1/2002 | Smuk | ..................... 297/378.12 |
| 6,341,819 B1 | | 1/2002 | Kojima et al. | |
| 6,474,739 B1 | * | 11/2002 | Lagerweij | .................... 297/341 |
| 6,616,233 B1 | * | 9/2003 | Debus et al. | ................ 297/341 |
| 6,641,218 B2 | * | 11/2003 | Ito et al. | ................. 297/378.12 |
| 2003/0122412 A1 | * | 7/2003 | Niimi et al. | ................. 297/341 |

* cited by examiner

Primary Examiner—Milton Nelson, Jr.
(74) Attorney, Agent, or Firm—Burns, Doane, Swecker & Mathis, L.L.P.

(57) ABSTRACT

A walk-in apparatus of a vehicle seat comprises an upper rail assembled to the vehicle seat, a lower rail engaged slidably with the upper rail and assembled to a vehicle floor; a lock plate locking a slide movement of the upper rail to the lower rail, a release lever engaged with the lock plate for releasing the locking of the slide movement of the upper rail on the lower rail and a reclining plate rotating in conjunction with a seat back when the seat back is rotated equal to or more than a predetermined angle in forward direction. The walk-in apparatus also includes a member for connecting the release lever and the reclining plate and is adapted to disengage the release lever from the reclining plate when a load is applied to the connecting member equal to or more than a predetermined value.

8 Claims, 5 Drawing Sheets

FIG.6     Inside of the seat width direction

WALK-IN APPARATUS FOR VEHICLE SEAT

This application is based on and claims priority under 35 U.S.C. § 119 with respect to Japanese Application No. 2002-285353 filed on Sep. 30, 2002, the entire content of which is incorporated herein by reference.

FIELD OF THE INVENTION

This invention generally relates to a walk-in apparatus for a vehicle seat. More particularly, the present invention pertains to the walk-in apparatus for the vehicle seat, which provides a forward slide movement of the vehicle seat relative to a vehicle floor in conjunction with a forward reclining movement of a seat back of the vehicle seat relative to a seat cushion.

BACKGROUND OF THE INVENTION

A known walk-in apparatus is disclosed, for example, in a U.S. Pat. No. 6,341,819 as a seat slide device for a vehicle.

The walk-in apparatus assembled to a slide rail mechanism, which slidably supports a vehicle seat in longitudinal direction relative to a vehicle floor, is adapted to release a lock plate by a released lever which rotates in conjunction with a pivotal movement of the seat back when the seat back of the vehicle seat is reclined as well as to release by a slide rail mechanism including an operation handle for unlocking the lock plate by hand. Such lock plate is applied biasing force for locking the slide movements of the slide rail mechanism.

Thus, such walk-in apparatus includes the reclining plate as a component of the reclining arm mechanism for rotating the seat back by a pivotal movement in forward direction of the vehicle, and the reclining plate are connected to release lever as a component of the slide rail mechanism through a rod.

However, the known walk-in apparatus has the slide rail mechanism which is adapted to release the locking of the slide movement by way of both operating the operation handle and forwardly reclining the seat back. In this apparatus, if the seat back is reclined for operating the walk-in apparatus without knowing that the operating handle happens to be locked because of unexpected reasons, a member for locking the slide rail mechanism may be transformed or even broken due to input of the unreasonable load, as a result, the locking operation of the slide rail mechanism malfunctions.

Thus, the walk-in apparatus needs to be comprised in consideration of ensuring the locking operation of the slide rail mechanism even if the unreasonable load is applied to the member for locking the slide rail mechanism when the operating handle of the slide rail mechanism is locked.

SUMMARY OF THE INVENTION

The invention involves a walk-in apparatus of a vehicle seat which comprises an upper rail assembled to the vehicle seat, a lower rail engaged slidably with the upper rail and assembled to a vehicle floor; a lock plate locking a slide movement of the upper rail on the lower rail, a release lever which is adapted to engage with the lock plate for releasing the locking of the slide movement of the upper rail on the lower rail by the lock plate and a reclining plate which rotates in conjunction with a seat back when the seat back is rotated equal to or more than a predetermined angle in forward direction characterized in that the walk-in apparatus of the vehicle including a connecting member for connecting the release lever and the reclining plate is adapted to disengage the release lever from the reclining plate when a load is applied to the connecting member equal to or more than a predetermined value.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements and wherein.

DETAILED DESCRIPTION OF THE INVENTION

Referring now to an embodiment of the walk-in apparatus for the vehicle of the present invention with reference to the attached drawings, FIG. 1 through FIG. 7

Figure 1:
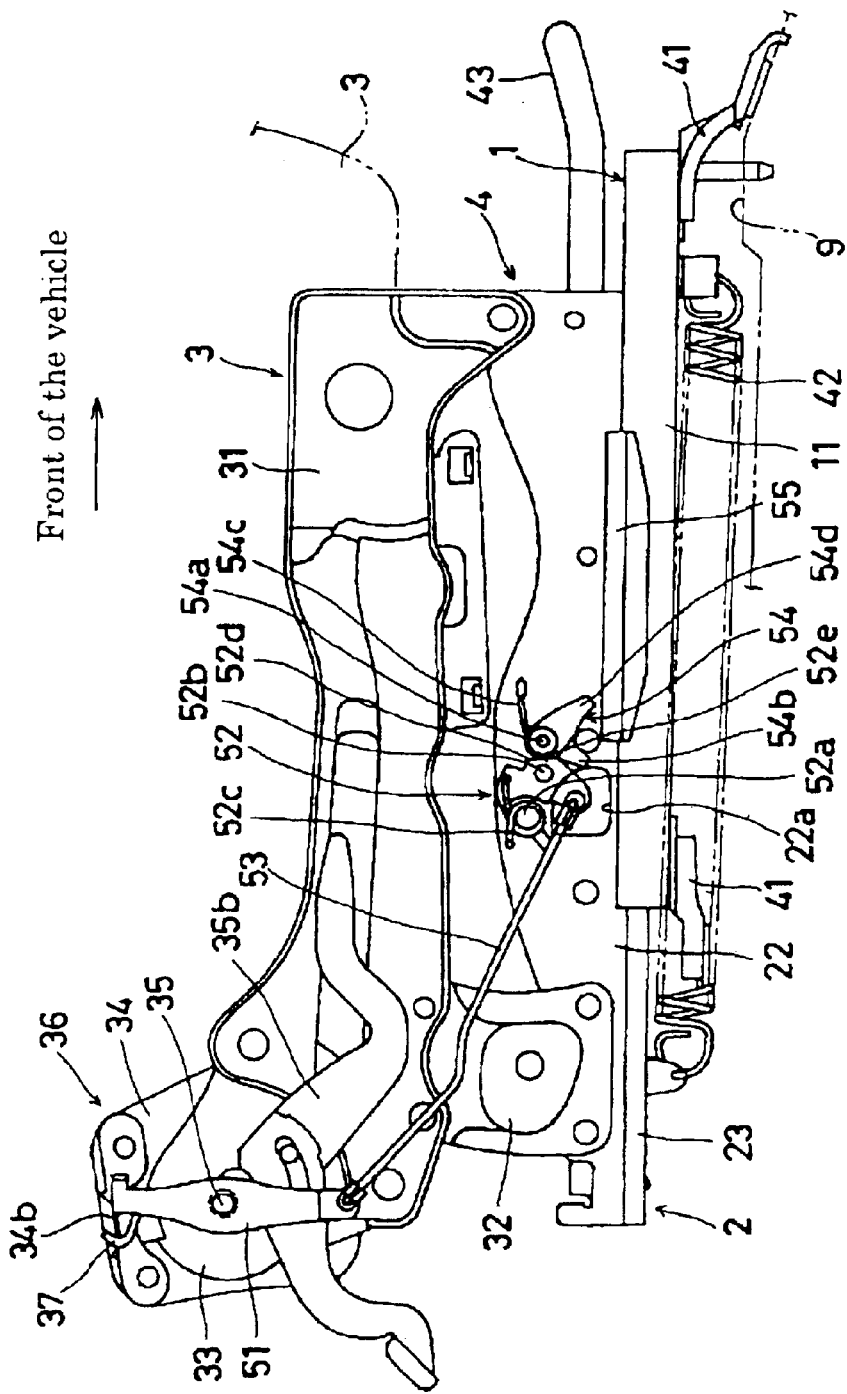
FIG. 1 illustrates a side view of the vehicle seat including the walk-in apparatus in accordance with the present invention.
Figure 5:
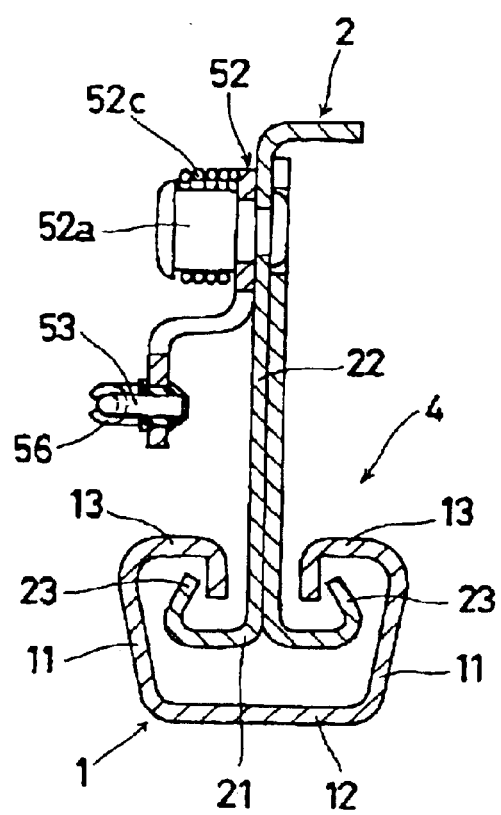
FIG. 5 illustrates a longitudinal sectional view of the release lever portion of the walk-in apparatus for the vehicle seat in FIG. 1 in accordance with the present invention.
Figure 6:
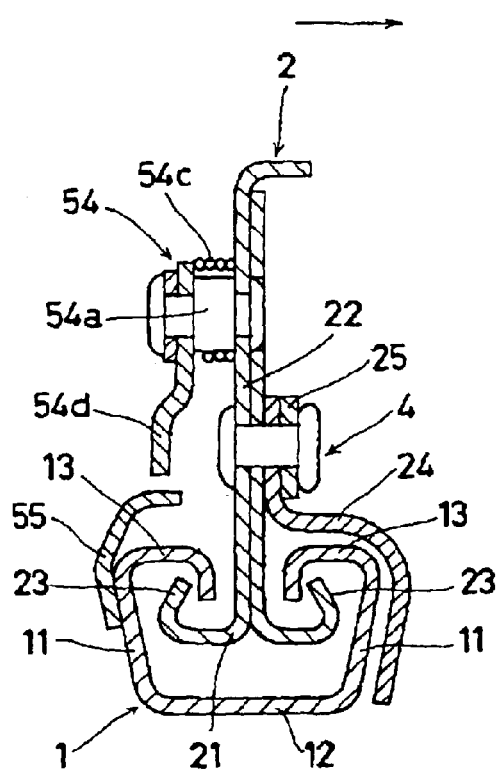
FIG. 6 illustrates a longitudinal sectional view of the supporting lever portion of the walk-in apparatus for the vehicle seat in FIG. 1 in accordance with the present invention.
Figure 7:
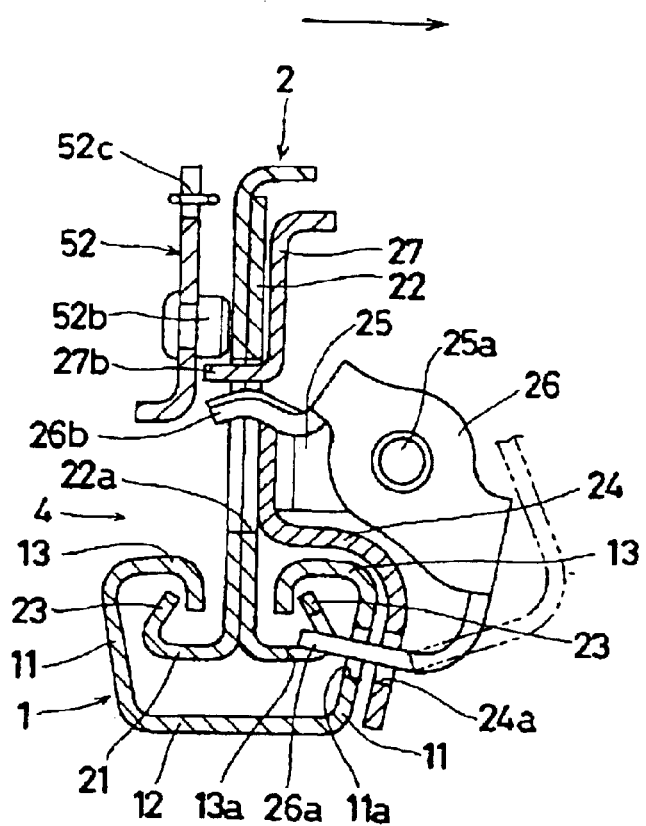
FIG. 7 illustrates a longitudinal sectional view of the lock plate portion of the walk-in apparatus for the vehicle seat in FIG. 1 in accordance with the present invention.

As shown in FIG. 1, a slide rail mechanism 4 in accordance with the invention is attached to the both right and left of the vehicle seat and bears a pair of lower rails 1. The lower rails 1 are arranged parallel to each. The lower rail 1 is elongated in vehicle longitudinal direction and includes side walls 11 and a base portion 12. The base portion 12 is provided between both side walls 11 for connecting each other, so that the lower rail 1 has an approximately U-shaped form from its cross sectional view as shown in FIG. 5 through FIG. 7. Engaging flange walls 13 are formed on the lower rail 1, which continuously extend from the top edges of the both side walls 11 and bend inwardly facing each other with a predetermined clearance.

Upper rail 2 is fixed to a frame 31 which forms a part of the seat cushion (not shown) of the vehicle seat by a bracket 32 and elongated in vehicle longitudinal direction. The upper rail 2 include horizontal walls 21 and vertical walls 22 and have an approximately contra T-shaped form from its cross sectional view. The engaging flange walls 23 are formed on the upper rail 2, which continuously extend from the both edges of the horizontal walls 21 of the upper rail 2 and bend in the upward direction. The engaging flange walls 23 of the upper rail 2 engage with the engaging flange walls 13 of the lower rail 1, thus the upper rail 2 is slidably supported by the lower rail 1 in vehicle longitudinal direction. The vertical walls 22 of the upper rail extend upward between the engaging walls 13. A spring 42 is provided between a front edge of the lower rail 1 (rightward in FIG. 1) and a rear edge of the upper rail 2, and the upper rail 2 is constantly forced by biasing force of the spring 42 for sliding in front direction of the vehicle (in the direction of an arrow) on the lower rail 1.

On inner side wall 11 of the lower rail 1 with respect to the seat width direction (right direction in FIG. 7), a series of engaging holes 11a is formed. The engaging holes 11a are formed with a predetermined interval in longitudinal direction of the lower rail 1. A penetration hole 13a which are adapted to accord with the engaging hole 11a, is formed on inner engaging flange wall 23 of the upper rail 2 with respect to the seat width direction. An auxiliary plate 24, which forms a through hole 24a being able to accord with the engaging hole 11a, is fixed to the inner vertical wall 22 with respect to the seat width direction.

A bracket 25 is fixed on the upper rail 2 together with the auxiliary plate 24. A lock plate 26 is pivotally held on the bracket 25 by pin 25a. The lock plate 26 possesses engaging teeth 26a which penetrate through the through hole 24a and the penetration hole 13a and is adapted to engage or disengage with the engaging hole 11a. The lock plate 26 is biased consistently by a spring (not shown) provided around the pin 25a in clockwise direction in FIG. 7 to allow the engaging teeth 26a to be engaged with the engaging hole 11a. An engagement flange 26b is formed on the lock plate 26, which faces to the engaging teeth 26a across the pin 25a.

Figure 2:
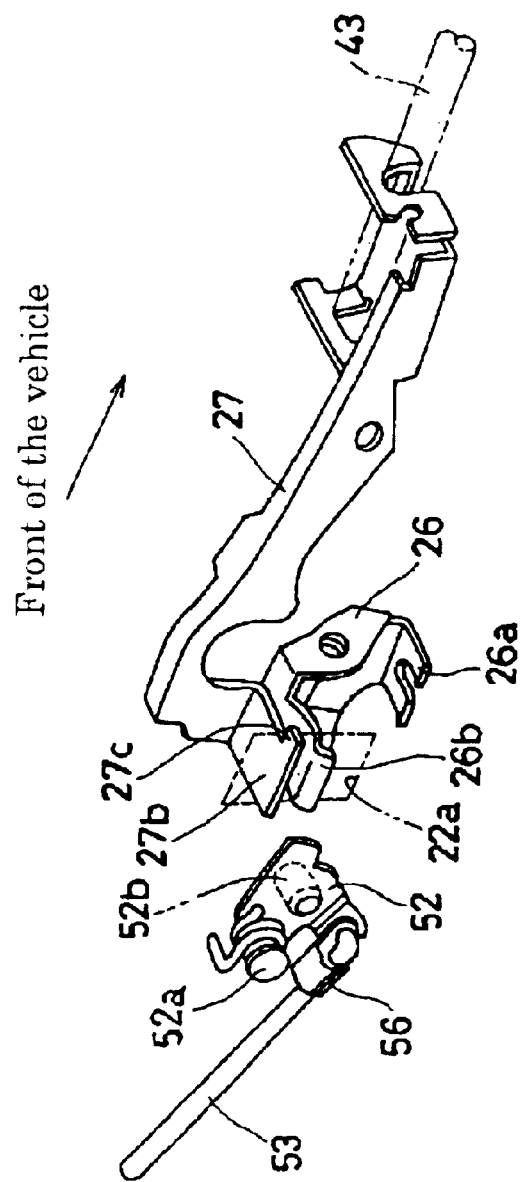
FIG. 2 illustrates a perspective view of a locking mechanism of the vehicle seat which includes the walk-in apparatus in accordance with the present invention.

As shown in FIG. 2 and FIG. 7, an operating lever 27 is provided on inner vertical wall 22 of upper rail 2 with respect to the seat width direction and pivotally held at the central portion in longitudinal direction of the operating lever 27. An engaging flange 27b is formed at the rear edge of the operating lever 27 (left in FIG. 2) with respect to longitudinal direction of the operating lever 27, and an operation handle 43 is fixedly held at the front edge of the operating lever 27 with respect to longitudinal direction. The operation handle 43 connects both right and left operating levers 27 and forms so-called a loop handle, which is provided under the front portion of the seat cushion for operating the both right and left operating levers 27 integrally. The engaging flange 27b is provided facing to the lock plate 26 and adapted to engage with the lock plate 26 at its lower portion. The operating lever 27 is consistently and rotatably biased by a spring (not shown) to space the engaging flange 27b from the lock plate 26 (upper direction in FIG. 5).

According to such configuration, the engaging teeth 26a of the lock plate 26 engages with the engaging hole 11a on the lower rail 1, as a result, the slide operation of the upper rail 2 relative to the lower rail 1 is limited. In this way, the vehicle seat keeps its position at a predetermined position relative to the vehicle floor 9. In addition, by uplifting the front edge (right edge in FIG. 1) of the operating lever 27, the operating lever 27 is rotated against the biasing force by the spring. Then, the rear edge (left edge in FIG. 1) of the operating lever 27 is lowered, and the engaging flange 26b contacts the engaging flange 27b, which causes the rotation of the lock plate 26. Then, the engaging teeth 26a disengage from the engaging hole 11a, and the upper rail 2 becomes freely slidable relative to the lower rail 1. Thus, the vehicle seat can be slidable on the vehicle floor 9 in vehicle longitudinal (back and forth). In this way, the position of the vehicle seat relative to the vehicle floor 9 in vehicle longitudinal direction can be adjusted.

As shown in FIG. 1, an upper arm 34 is fixed to the lower side surfaces of a frame (not shown) which forms a part of the seat back of the vehicle seat, and is freely rotatably held by a lower arm 33. A pivot shaft 35 penetrates through and is supported by the upper arm 34 and the lower arm 33. Known a ratchet and a pawl (not shown) are provided between the lower arm 33 and the upper arm 34, which are engaged or disengaged by an operation of an operation handle 35b which is integrally assembled to the pivot shaft 35.

A reclining arm mechanism 36 comprises the lower arm 33, the upper arm 34 and the pivot shaft 35, which reclines the seat back of the vehicle seat relative to the seat cushion in vehicle longitudinal direction (back and forth). A spring 37 is provided between the lower arm 33 and the upper arm 34, and the lower arm 33 is constantly and pivotally biased by the spring 37 in front direction of the vehicle. Reclining plates 51 are held to each edges of the pivot shaft 35 of the reclining arm mechanism 36 allowing its relative pivotal movement. A reclining plate 51 is assembled keeping a predetermined clearance between its the upper portion and bracket 34b which is fixed to the upper arm 34 when the upper arm 34 is in the most front seating position.

The release lever 52 is held by pin 52a allowing pivotal movement on the outer surfaces of the vertical wall 22 of the upper rail 2 with respect to the seat width direction. The release lever 52 extends and forms an arm portion. One end of the rod 53 (connecting member) is rotatably connected to the edge of the arm portion by resin made snap 56, and the other end of the rod 53 is connected to the reclining plate 51 by snap 56.

In this configuration, when large load is applied to the release lever 52 by the rod 53 for some reasons, which is pulling the release lever 52 to the rod 53 side, the snap 56 is broken and come off hole 52f, and the rod 53 disengages from the release lever 52.

As shown in FIG. 7, an engaging pin 52b which projects toward the vertical wall 22 of the upper rail 2 is fixed to the release lever 52. The engaging flange 27b of the operating lever 27 penetrates through the opening 22a which is formed on the vertical walls 22 of the upper rail 2 and extends toward the engaging pin 52b for being able to engage with the engaging pin 52b on its upper surface of the engaging flange 27b. As shown in FIG. 2, a nail portion 27c is formed on the edge of the engaging flange 27b of the operating lever 27. The nail portion 27c projects in width direction of the engaging flange 27b, and its width is wider than the opening 22a. By virtue of the nail portion 27c, if there is, for example, an unexpected thing under the vehicle seat, and it prevents the rear end portion of the operating lever 27 from moving toward rear of the vehicle, and the engaging pin 52b engages with the engaging flange 27b applying excessive force to the engaging flange 27b, the engaging flange 27b is supported by the edge of the opening 22a, so that the engaging flange 27b keeps their shape better.

Thus, by virtue of the composition of the combination of the rod 53, the release lever 52 and the operating lever 27, if the walk-in apparatus is operated when the operating lever 27 is restrained, the rod 53 becomes disengaged from the release lever 52, and the locking function is secured without the excessive load which is applied to the locking member of the slide rail mechanism 4 by the reclining plate 51. Thus, the walk-in apparatus can be restored by changing the snap 56.

In addition, the rod 53 may be disengaged from the reclining plate 51, or the rod 53 may be separable condition for disengaging the release lever 52 and the reclining plate 51 when the excessive load is applied.

As shown in FIG. 5, the release lever 52 is constantly applied a biasing force of the spring 52c which is provided around the pin 52a in anticlockwise direction in FIG. 1.

Figure 3:
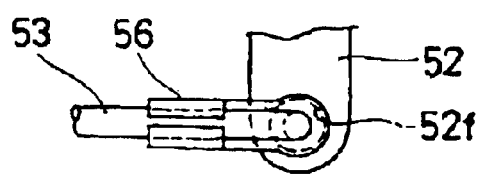
FIG. 3 illustrates a plain view of the connecting portion (connecting members) which connects the release lever and the rod in the walk-in apparatus of the vehicle seat in accordance with the present invention.
Figure 4:
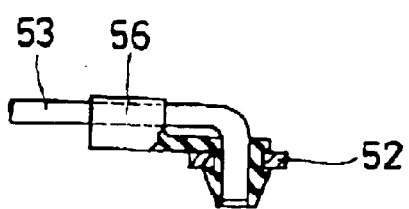
FIG. 4 illustrates a side view of the connecting portion (connecting members) which connects the release lever and the rod in the walk-in apparatus of the vehicle seat in accordance with the present invention.

As shown in FIGS. 1, 2, and 3, a supporting lever 54 is pivotally held by a pin 54a on the outer surfaces of the vertical wall 22 of the upper rail 2. The supporting lever 54 has edge surfaces at the same high level of edge surfaces of the release lever 52. An engaging shoulder 52d and a contacting projecting portion 52e are formed on the peripheral surfaces of the release lever 52, which are facing to the supporting lever 54. On the other hand, an arm portion 54b which is adapted to engage with the engaging shoulder 52d is formed on the peripheral surfaces of the supporting lever 54.

As shown in FIG. 6, a spring 54c is provided around the pin 54a, which is constantly pivotally applying biasing force to the supporting lever 54 in clockwise direction in FIG. 1. When the upper portion of the reclining plate 51 disengages with the bracket 34b, in other words, the reclining plate 51 is not in conjunction with the pivotally movement of the seat back, the engaging pin 52b of the release lever 52 departs from the engaging flange 27b. In this condition, the locking of the slide movement of the upper rail 2 on the lower rail 1 is released disengaging the lock plate 26 from the engaging hole 11a by the rotation of the operating lever 27.

Memory plate 55 is fixed on the outer surfaces of the engaging flange 13 and the side wall 11, which is provided on the outer lower rail 1 with respect to the seat width direction. A leg portion 54d is formed on the supporting lever 54 for engaging with the memory plate 55. The operation of the walk-in apparatus will be explained.

When the seat back is reclined forward more than or equal to the predetermined angle relative to the seat cushion (folding forward), the predetermined clearance is reduced, then the bracket 34b of the upper arm 34 contacts the reclining plate 51. The reclining plate 51 pivots in clockwise direction in FIG. 1. The pivotal movement of the reclining plate 51 leads the rod 53 toward rear of the vehicle, and the release lever 52 pivots A in clockwise direction in FIG. 1 opposite to biasing force of the spring 52c.

Thus, the engaging pin 52b of the release lever 52 moves toward the engaging flange 27b from its position in FIG. 7 and engages with the upper surface of the engaging flange 27b of the operating lever 27 and pushes down the engaging flange 27b. Then, the operating lever 27 is rotated, and the under surface of the engaging flange 27b engages with the engaging flange 26b of the lock plate 26. Thus, the engaging flange is pushed down. The lock plate 26 is rotated in anticlockwise direction on FIG. 7 opposite to biasing force by the spring (not shown). The engaging teeth 26a of the lock plate 26 disengages from the engaging hole 11a of the lower rail 1, and the upper rail 2 slides relative to the lower rail 1 by biasing force of the spring 42. In this way, the vehicle seat slides in front direction of the vehicle relative to the vehicle floor 9.

When the vehicle seat slides and the leg portion 54d of the supporting lever 54 moves ahead over the range of the memory plate 55, the contacting projecting portion 52e of the release lever 52 disengages from the contacting depressed portion 54e of the supporting lever 54 by the rotation of the release lever 52 in clockwise direction in FIG. 1, and the arm portion 54b of the supporting lever 54 engages with the engaging shoulder 52d of the release lever 52. The rotation of the release lever 52 in anticlockwise direction by biasing force of the spring 52c is limited, and the release lever 52 is held in a predetermined position. Thus, the disengaging condition between the engaging teeth 26a of the lock plate 26 and the engaging hole 11a of the lower rail 1 is maintained. In this condition, the leg portion 54d of the supporting lever 54 is set on the track of the slide movement of the memory plate 55.

The bracket 34a of the upper arm 34 and the reclining plate 51 becomes disengaged, when the forwardly reclined seat back is restored to its original condition as mentioned above, in other word, the seat back is reclined in rear direction of the vehicle relative to the seat cushion, then the vehicle seat slides in rear direction of the vehicle relative to the vehicle floor 9 (The seat may recline and slide at the same time). The leg portion 54d of the supporting lever 54 engages with the memory plate 55, so that the supporting lever 54 is rotated in the anticlockwise direction in FIG. 1 against the biasing force of the spring 54c.

Then, the arm portion 54b and the engaging shoulder 52d of the release lever 52 becomes engaged, and the release lever 52 is rotated in anticlockwise direction in FIG. 1 by biasing force of the spring 52c and restored to the condition which is shown in FIG. 1. As a result, the engaging pin 52b of the release lever 52 and the engaging flange 27b of the operating lever 27 become disengaged, and the under surface of the engaging flange 27b and the engaging flange 26b of the lock plate 26 are disengaged, then the lock plate 26 is rotated in clockwise direction in FIG. 7 by the biasing force of the spring (not shown).

Thus, the engaging teeth 26a of the lock plate 26 engage with the engaging hole 11a of the lower rail 1, and the slide movement of the upper rail 2 on the lower rail is limited. In this way, the vehicle seat is held in the predetermined position relative to the vehicle floor 9.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the sprit of the present invention. Accordingly, it is expressly intended that all such variations, changes and equivalents which fall within the spirit and scope of the present invention as defined in the claims, be embraced thereby.

What is claimed is:

1. A vehicle seat arrangement comprising:

an upper rail assembled to a vehicle seat;

a lower rail engaged slidably with the upper rail and assembled to a vehicle floor;

a lock plate locking a slide movement of the upper rail on the lower rail;

a release lever which is adapted to engage with the lock plate for releasing the locking of the slide movement of the upper rail on the lower rail by the lock plate;

a reclining plate which rotates in conjunction with a seat back when the seat back is rotated equal to or more than a predetermined angle in forward direction, and a connecting member for connecting the release lever and the reclining plate and adapted to disengage the release lever from the reclining plate when a load is applied to the connecting member equal to or more than a predetermined value.

2. A vehicle seat as set forth in the claim 1, wherein a plurality of snaps are provided on the connecting member.

3. A vehicle seat as set forth in the claim 1, wherein a snap is provided between the connecting member and the release lever and another snap is provided between the connecting member and reclining plate.

4. A vehicle seat as set forth in the claim 2, wherein the snap is made of resin material.

5. A walk-in apparatus for a vehicle seat which is adapted to be connected to an upper rail slidably engaged with a lower rail assembled to a vehicle floor, the walk-in apparatus comprising:

a lock plate for locking sliding movement of the upper rail on the lower rail;

a release lever adapted to engage the lock plate for releasing the locking of the sliding movement of the upper rail on the lower rail by the lock plate;

a reclining plate adapted to rotate in conjunction with a seat back of the vehicle seat when the seat back is rotated equal to or more than a predetermined angle in a forward direction; and a connecting member for connecting the release lever and the reclining plate and adapted to disengage the release lever from the reclining plate when a load is applied to the connecting member equal to or more than a predetermined value.

6. A walk-in apparatus as set forth in the claim 5, wherein a plurality of snaps are provided on the connecting member.

7. A walk-in apparatus as set forth in the claim 5, wherein a snap is provided between the connecting member and the release lever and another snap is provided between the connecting member and reclining plate.

8. A walk-in apparatus as set forth in the claim 6, wherein the snap is made of resin material.

* * * * *